Nov. 22, 1960     S. L. BROADHEAD, JR     2,961,605
COMBINATION LOADING DETECTOR AND STANDING WAVE INDICATOR CIRCUIT
Filed Jan. 9, 1957
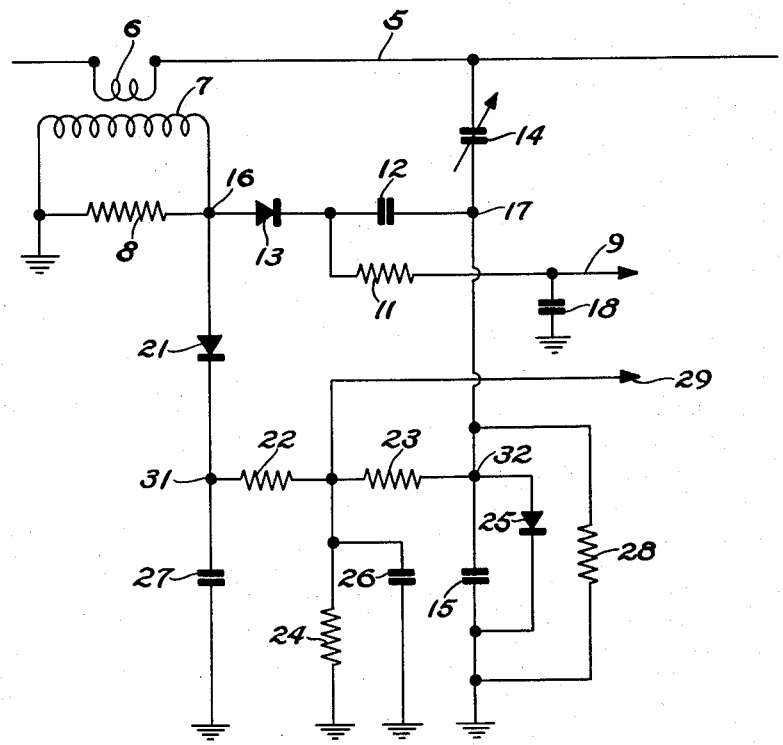
INVENTOR.
SAMUEL L. BROADHEAD JR.
BY *Moody and Harsha*
ATTORNEYS

# United States Patent Office 2,961,605
Patented Nov. 22, 1960

2,961,605

COMBINATION LOADING DETECTOR AND STANDING WAVE INDICATOR CIRCUIT

Samuel L. Broadhead, Jr., Cedar Rapids, Iowa, assignor to Collins Radio Company, Cedar Rapids, Iowa, a corporation of Iowa Filed Jan. 9, 1957, Ser. No. 633,251

4 Claims. (Cl. 324—58)

This invention relates to devices for comparing electrical characteristics and more particularly to such devices for comparing electrical impedances especially at high frequencies.

One method of comparing impedances between a load and the line is by a loading detector which provides an indication of the voltage-to-current ratio of the transmission line. Another means of comparing such impedances is to use a standing wave ratio indication. This standing wave ratio indication may also be calculated from a voltage-to-current ratio or it may be calculated from a voltage-to-voltage comparison between voltages at two different points along a transmission line. Impedance comparison devices are very useful in that they permit the impedance matching of the load and the transmitter through coupling devices. As is well-known in the art, if the impedance match is properly made between the transmitter, the transmission line, and the load, power is delivered with maximum efficiency to the load or radiated by an antenna if it be the load.

Load indicators are normally connected to a servo system which tunes a coupling device so as to provide the proper impedance match between the transmitter, the transmission line, and the antenna. Standing wave ratio comparisons are used merely as an indication of the impedance of the transmission line when compared to the load and are not normally used to control a coupling system.

Prior load indicator circuits have obtained the voltage-to-current ratio of the signal on the transmission line by inserting a resistance in series with the transmission line and then comparing the voltage developed across this resistance with a voltage divided down from the transmission line. Standing wave ratio bridges, which are well-known in the art, normally insert resistance elements in series with the line to obtain the voltages necessary for the bridge balancing. Insertion of a resistance in series with a transmission line causes a resultant loss of power which power could be expended as radiated power. Granted, there are certain situations where a standing wave ratio indicator or a load indicator which uses large amounts of power is desirable. Such power using devices would normally be used when signal generators or other sources of weak signal strength outputs are connected to a transmission line. The novel comparison devices of this invention are best adapted for use as monitoring devices where the signal source generates a large output and where it is desired that subsequently all of this power be emitted from the load or antenna.

Several unsuccessful attempts have previously been made to provide impedance comparison devices which would not have the high power loss characteristics of the series inserted resistance devices. One of the primary reasons these attempts have been unsuccessful is that the resulting comparison devices have been too sensitive to frequency differences for normal use.

This invention provides a novel standing wave ratio and load indicator system in combination. This invention does not utilize a resistance in series with the line to develop a comparison voltage, but rather uses an inductive coupling to develop this voltage. The novel impedance comparison devices of this invention are not frequency sensitive and absorb a minimum amount of power from the associated transmission line.

It is an object of this invention to provide a combination standing wave ratio and loading detector which is inductively coupled to a transmission line and yet is not frequency sensitive. It is another object of this invention to provide a combination standing wave ratio and load detector indication circuit which produces negligible resistance with its resultant loss of power in its associated transmission line. It is still another object of this invention to provide a combination standing wave ratio and load indicator associated with a transmission line where the indicator exhibits a flat response characteristic regardless of the frequency of the signal transmitted. It is a further object of this invention to provide a combination standing wave ratio and load indicator device where the power available in the transmission line is only negligibly reduced by the indication device. These and other objects of this invention will become apparent when the following description is read in conjunction with the drawing, the single figure of which is a schematic representation of one embodiment of this invention.

Referring now to the figure, the transmission line 5 may be assumed to connect a source of radio frequency energy with a load. The load and the source of radio frequency energy are not depicted, but could be connected to either side of the section of transmission line 5 which is illustrated. The transmission line 5 would normally be a coaxial cable with the element shown as the transmission line 5 being the inner conductor thereof. The outer conductor of the coaxial cable which is connected to ground is not shown.

The inner conductor 5 has a coil 6 including a small number of turns formed therefrom. This small number of turns in actual practice would be a single turn of this inner conductor. Tightly coupled to this turn of the inner conductor through a hole cut in the external conductor is a coil 7 having a large number of turns. These turns of coil 7 remove the desired portion of the transmitted signal on line 5 which activates the standing wave ratio indicator and the load indicator of this invention. As has been mentioned, the load indicator provides a voltage indication or error signal when the voltage-to-current ratio of the energy carried by the transmission line 5 is different from a desired and predetermined ratio. The standing wave ratio indicator provides a signal when the voltage-to-current ratio of the line differs from a predetermined value or when the phase of the voltage on the line differs from the phase of the current on the line.

The coil 7 inductively removes a portion of the signal flowing in line 5 and this removed signal will be proportional to the amount of current flowing in the transmission line. It is obvious that the voltage developed across the coil 7 is a current generated voltage. This voltage developed by coil 7 will subsequently be compared to the actual voltage on the transmission line. The actual voltage on the transmission line is tapped off by connections to be described later. The voltage generated across the coil 7 causes a current to flow in the coil 7 and the resistance 8 which is connected across the ends of coil 7. This resistance element 8 normally has a very small ohmic value and is approximately 20 ohms in one embodiment of this invention which was caused to be constructed. The combination of the small value of resistances and the inductive coupling of coil 7 causes a current flow in the coil and resistance which is almost in phase with the line current in the transmission line. Thus, the signal or voltage developed across the coil 7 is subsequently independent of the frequency of the signal transmitted on the transmission line 5. This voltage which is developed by the operation of the coil 7 and the resistance 8 is a comparison voltage to be compared with the voltage on the transmission line 5. One such comparison is in the loading detector circuit of this invention. The loading detector circuit includes the diodes 21 and 25; the resistance elements 22, 23, and 24; and the capacitance elements 15 and 26.

The resistance elements 22, 23, and 24 form a resistance network which is responsive to a direct current voltage differential between points 31 and 32. These voltages which are compared are developed as follows: The direct current voltage at point 31 is developed by the passage of rectified current through diode 21 and includes the filtering action of the capacitance element 27. The single embodiment of this invention which is shown results in a small positive potential of voltage being developed at point 31.

At point 32 a direct current voltage is developed from the alternating current voltage which has been divided down from the transmission line 5. The alternating current voltage is divided down from the transmission line by the variable capacitance element 14 and the capacitance element 15. This divided down alternating current voltage is rectified by the action of diode 25, and the components in one embodiment of this invention were chosen so as to produce a negative direct current voltage of essentially the same voltage as the positive direct current voltage at point 31. When these two voltages are equal in magnitude and opposite in polarity, no current flows in the resistance elements 22, 23, and 24 and no loading error signal is developed. However, if one or the other of these direct current voltages is larger, a current flows in the resistance network and an error voltage is developed. This error voltage will be connected to lead 29 and then applied to a servo mechanism system to change the load impedance and result in a proper impedance match between the transmitter and the antenna. Proper impedance matching will result in the flow of no loading current to the output connection 29. Any small phase difference or frequency difference which may result from the coupling action of the coil 7 and the resistance 8 is balanced out by the use of the impedance or resistance element 28.

At the same instant that the voltage developed by the different flow on the transmission line 5 is being used to compare with the voltage divided down from the line itself to provide a loading error, the developed voltage is also being used to compare with the voltage divided down from the transmission line on a standing wave ratio basis. The standing wave ratio indication between the current developed voltage and the voltage on the line is produced by the action of diode 13, the capacitance element 12, and the resistance element 11. The alternating current voltage which is developed at point 16 by the coil 7 and the resistance 8 is compared with the alternating current voltage from the line which has been divided down by the capacitance elements 14 and 15 and applied to point 17. If one or the other of these points 16 and 17 has a larger voltage or a voltage of different phase applied to it than the other, the diode 13 will permit direct current flow in one direction. An error signal is then developed across resistance element 11 and applied to the output lead 9. The signal which is developed across resistance 11 is normally a direct current voltage and capacitance 18 is connected as a filtering means to insure the removal of any alternating current ripple. Capacitance 12 is inserted in the circuit as a coupling condenser by the points 16 and 17 to insure that there is a minimum amount of phase shift between points 16 and 17. The standing wave ratio indicator will indicate a single type of error, this being when the voltage developed at point 16 is more positive than the voltage developed at point 17 due to the unilateral resistance characteristic of the diode 13.

Thus, this invention provides a combination standing wave ratio indicator and load indicator which uses a single current developed voltage for comparison with the actual voltage in the line. It is obvious that this invention provides both of these indicator services with only a small amount of power removed from the available transmission signal thereby permitting use as a monitoring device. It is also obvious that these indications are subsequently independent of frequency due to the almost complete inphase characteristic of the developed voltage used for comparison with the actual voltage on the line.

Although this invention has been described with respect to a particular embodiment thereof, it is not to be so limited as changes and modifications may be made therein which are within the full intended scope of the invention as defined by the appended claims.

What is claimed is:

1. An impedance comparison device including in combination a loading detector and a standing wave ratio indicator to compare the impedance of a transmission line and a load, including means for generating a first output voltage proportional to the current in said transmission line, said means consisting of a coil means inductively coupled to said transmission line and a first resistive element connected across the ends of said coil means to provide across said coil means a first output voltage whose phase is substantially the same as the phase of said current in said transmission line and which provides a flatter frequency response curve than obtainable in the absence of said resistive element, means including first unilateral conduction means and an impedance means connected in series arrangement across at least a portion of said first resistive coil means whereby said first output voltage is converted to a first direct current voltage, voltage dividing means for dividing down the voltage on said transmission line, said voltage dividing means comprising first capacitive means connected to said transmission line and second capacitive means connected in series with said first capacitive means, second unilateral conduction means connected across said second capacitive means whereby a second direct current voltage is generated thereacross, resistor means connected across said second unilateral conduction means for producing small phase shifts and amplitude changes with frequency changes to compensate for small phase shifts and amplitude changes introduced into the voltage developed across said coil means with frequency changes, comparison means coupled to said first and second unilateral conduction means for comparing the first direct current voltage proportional to the current in said transmission line to the second direct current voltage proportional to the voltage on said transmission line, said comparison means including a plurality of resistive elements and constructed to produce an output signal when said direct current voltages do not have magnitudes of a predetermined ratio, and a standing wave ratio indicator connected between a point on said voltage dividing means and a terminal of said coil whereby a signal is generated which is indicative of the standing wave voltage ratio existing in said transmission line.

2. An impedance comparison device in accordance with claim 1 in which said standing wave ratio indicator comprises a rectifier circuit responsive to said first output voltage and the divided voltage of said transmission line appearing across said second capacitive means to produce a signal which is indicative of the standing wave voltage ratio existing on said transmission line.

3. A combination standing wave ratio indicator and load detector for providing signals indicative of an impedance ratio between a load and a transmission line for providing an output signal indicative of the standing wave ratio of the signals on said transmission line, including a voltage generating means, said voltage generating means consisting of a coil means inductively coupled to said transmission line and a resistive element connected across the ends of said coil means to produce a first voltage across said coil means which is substantially in phase with the current on said transmission line and which has a flatter frequency response curve than obtainable in the absence of said resistive element, voltage dividing means connected to said transmission line for dividing down the voltage thereon, said voltage dividing means comprising first capacitive means connected to said transmission line and second capacitive means connected in series with said first capacitive means, first and second detector means responsive to said first voltage and the voltage across a portion of said voltage divider respectively to produce first and second direct-current voltages proportional in magnitude to said first voltage and the voltage appearing across said second capacitive means respectively, voltage comparison means coupled to said first and second detector means for comparing said first and second direct-current voltages and producing an output signal when the magnitudes of said direct-current signals are not of a predetermined ratio, said standing wave ratio indicator comprising first and second input terminals, means for supplying the voltage appearing across said coil means to a first terminal of said standing wave ratio indicator, and means for supplying the alternating current component of voltage appearing across said second capacitive means to the other terminal of said standing wave ratio indicator to produce a signal proportional to the standing wave voltage ratio existing on said transmission line.

4. A combination standing wave ratio indicator and load detector in accordance with claim 3 in which said standing wave ratio indicator comprises a rectifier circuit responsive to said voltage generated across said coil means and to said voltage appearing across said second capacitive means to produce a signal indicative of a standing wave voltage ratio of said transmission line.

References Cited in the file of this patent

UNITED STATES PATENTS

| | | |
|---|---|---|
| 2,205,873 | Buschbeck | June 25, 1940 |
| 2,467,648 | Alexander | Apr. 19, 1949 |
| 2,545,544 | Doherty | Mar. 20, 1951 |
| 2,611,861 | Heath | Sept. 23, 1952 |
| 2,797,387 | Adams | June 25, 1957 |
| 2,808,566 | Douma | Oct. 1, 1957 |
| 2,834,887 | Brown | May 13, 1958 |

OTHER REFERENCES

Morrison et al.: "A Method of Determining and Monitoring Power and Impedance at High Frequencies," Proc. of IRE, vol. 36 No. 2, February 1948, pp. 212–216.

Yu: "Meas. Phase at R-F and Video Frequencies." Electronics January 1956, pp. 138–140.